3,406,059
METHOD OF PRODUCING FUEL CELL ELECTRODE
Eugene K. Backe, Milwaukee, and Gary J. Wiskow, West Allis, Wis., assignors to Allis-Chalmers Manufacturing Company, Milwaukee, Wis.
No Drawing. Original application Feb. 2, 1966, Ser. No. 524,462. Divided and this application July 17, 1967, Ser. No. 663,468
4 Claims. (Cl. 75—222)

ABSTRACT OF THE DISCLOSURE

A sintered porous fuel cell electrode comprised of about 80 to 90% nickel powder and about 1 to 20% fibrous or filamentary nickel. The electrode is made by heating a uniform mixture of the nickel powder and nickel fibers, at a temperature of about 1300–2200° F. in a reducing atmosphere for a period of 10 to 60 minutes.

---

This is a division of application Ser. No. 524,462, filed Feb. 2, 1966.

This invention relates to improved fuel cell electrodes and more particularly, this invention deals with fuel cell electrodes comprised of a nickel body having improved power output and mechanical strength which electrochemically activate fuel cell fuels such as hydrogen, hydrazine, ammonia and alcohols, esters, carboxylates, hydrocarbons and carbonyl compounds of up to about 14 carbon atoms.

The term fuel cell, as used herein, refers to those electrochemical devices that convert the free energy of a chemical reaction directly to electrical energy. Such devices are well known in the art and although there are differences between various cells, a discussion of some of their common characteristics and problems will aid in the understanding of our invention.

As is known, oxidation-reduction reactions are accompanied by the transfer of electrons from the reductant to the oxidant. In individual fuel cells, the oxidation reaction and reduction reaction take place at spacially separated electrodes. At each electrode there occurs what is called a half-cell reaction. One electrode, called the anode, is the site of the oxidation half-cell reaction. A reactant, referred to as the fuel, that is oxidizable with respect to some oxidant, is supplied by suitable means to the anode, and is thereat electrochemically oxidized. Oxidation of the fuel releases electrons to the anode. At the other electrode called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through the electrolyte. The current produced in the external circuit can do useful work. Production of current will continue so long as fuel and oxidant are supplied and waste products exhausted.

The voltage of the individual fuel cell is limited by the theoretical free energy change ($\Delta F$) for the reaction at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, in cells operated at less than about 95° C., a catalyst is necessarily employed to bring the reactants to an activated state. The energy input required to reach an activated state, i.e., heat of activation, partly determines the speed of reaction. Through a mechanistic bypass, a catalyst brings about reaction with a smaller heat of activation.

Porous sintered nickel plaques have found extensive use as electrodes in fuel cells having a caustic electrolyte. These nickel plaques having a porosity up to 92 percent have been produced by using powders of low apparent density such as the so called "carbonyl nickel powder." The bonding of the loose carbonyl nickel powder to form a coherent mass occurs on heating at temperatures as low as 500° C. or on heating for a very brief period at 800° C. Such plaques may be made for instance from carbonyl nickel powder prepared by the thermal decomposition of dilute nickel carbonyl vapor. This powder, which can be made with an apparent density as low as 0.6 gram per cubic centimeter, sinters with ease in a protective atmosphere. To increase the mechanical strength of plaques made from high porosity nickel powder, a grid as for example a nickel screen is generally incorporated within the plaques.

A drawback in the use of screen backed sintered nickel electrodes is that a major portion of the electrode, i.e., the screen, is nonutilized weight and volume. In applications of a power source, such as in a space vehicle, both the savings in volume and weight are highly desirable. Hence, the art is continually seeking electrodes of reduced weight and volume without sacrifice of electrical output which can be employed in fuel cells.

If it is attempted to manufacture a sintered nickel electrode from the powder alone, the mechanical strength of the electrode as well as the electrical output is inferior to the screen supported sintered nickel powder electrode.

In accordance with the present invention, there is provided a sintered nickel electrode having improved mechanical strength and power output which is comprised of about 80 to about 99 percent by weight of a nickel powder and about 1 to about 20 percent by weight of nickel in a fibrous or filamentary form.

The electrode of the present invention is prepared by sintering the mixture of nickel powder and nickel filament in a reducing atmosphere such as hydrogen at a temperature in the range of about 1300° to about 2200° F. for a period of time ranging from about 10 minutes to about 1 hour and preferably from about 15 to about 30 minutes.

The sintered nickel electrodes of the present invention are characterized by substantial mechanical strength and desirable porosity. The electrodes ranging in thickness from about 0.005 to about 0.060 inch, are strong enough to withstand the handling and pressures encountered in fuel cell assembly and use. Because of the absence of the support screen, the use of these electrodes in fuel cell applications creates a considerable saving in bulk and greatly increases the volume efficiency of the fuel cell compared to fuel cells utilizing the screen supported sintered nickel electrodes of the prior art. In addition, the sintered nickel powder-nickel filament electrodes of the present invention have the unexpected advantage of increased power output when compared to sintered nickel electrodes of the prior art.

Generally, the nickel filaments suitable for use in this invention have a length considerably greater than their diameter, the length being appreciably greater than that of conventional metal granules or powders. The nickel filaments useful in preparing the electrodes of the present invention satisfactorily may have a diameter of between about 0.5 to about 10 microns and lengths ranging from about 50 to about 1000 microns.

The proportion of nickel filament material in the electrode mix ranges from about 1 to about 20 percent by weight and this range forms an essential and critical feature of the invention. As will be hereinafter illustrated, fuel cell electrodes containing a weight percent of nickel filament outside this range have disadvantageously reduced power outputs.

The nickel filaments used in the electrodes of the present invention may be prepared in any manner known to the art, as for example, grinding nickel bar stock on an abrasive belt and then separating and selecting the filamentitious nickel from the ground stock that is suitable for use in the mix from which the electrode is prepared.

In a preferred mode of preparing the electrodes of the present invention, it is highly desirable that the composite of nickel filaments used in the preparation of the electrodes have a relatively wide size distribution ranging from about −35 to −250 mesh as determined by sieve analysis. Advantageously, the size distribution of the nickel filaments comprises about 4 to about 7 weight percent −35 to 80 mesh, about 3 to about 5 weight percent −80 to 100 mesh, about 20 to about 30 weight percent −100 to 200 mesh, about 5 to about 10 weight percent −200 to 250 mesh and about 50 to about 60 weight percent −250 mesh.

Nickel powders which may be used to prepare the electrodes of the present invention are fine nickel powders such as carbonyl nickel powders (nickel powder which has been precipitated from carbonyl nickel vapors). Suitable carbonyl nickel powders include the A type (average particle size 4–5 microns), the B type (average particle size 2.9–3.6 microns) and the D type (average particle size 7–9 microns). The B type carbonyl nickel powder is preferred. Other nickel powders may be employed. Thus it is possible to use nickel powder which has been produced in powder form by electrolytic methods or other means, although the individual nickel powder employed should have a size not exceeding 10 microns.

The nickel powder-nickel filament electrodes of the present invention may be directly used as electrodes in the high temperature fuel cells (i.e., fuel cells operated above 300° F.) wherein no catalytic stimulation is required and where all ionization processes proceed with adequate speed. In the low temperature fuel cells, however, catalytic action must take place at the electrode surfaces for promoting gaseous adsorption, dissociation and reactions thereat. While the nickel powder-nickel filament electrode is catalytically active at the higher temperatures in these cells, the catalytic activity of the electrode can be measurably enhanced at the lower temperatures by applying a coating of a metal or metals of the class of noble metal catalysts, generally metals of Group VIII of the Periodic Table (viz. platinum, palladium, osmium, iridium, ruthenium and rhodium) to the surface of the electrode. Other catalysts which may be employed include metal oxides, such as nickel oxide and cobalt oxide, organometallics and the like. The black forms of the noble metals expose more surface to the gas reactants and hence are more active catalytically and are preferred.

In preparing the electrodes of the present invention, the nickel powder and nickel filament in the desired weight ratios are mixed by suitable means to obtain an intimate and uniform blend of powder and filament. The mixture is placed on the flat surface of a suitable refractory material and placed in a furnace under reducing conditions (as for example a hydrogen atmosphere) and heated to a temperature just below the melting point of the nickel mixture, generally about 1500° to 1800° F. for a period of time ranging from about 10 minutes to an hour. Sintering times of about 30 minutes are preferred. Longer sintering times, i.e., over 60 minutes, adversely affect the power output of the sintered nickel filament-nickel powder electrodes.

The sintered electrode is desirably cooled at ambient temperatures, and the cooled electrode material may then be used as is or compacted as by rolling the sintered electrode material between pressure rollers, or other suitable means to the desired electrode thickness. After compaction, the electrode may then be cut to the desired shape or size. The sintering procedure forms an electrode material which is a homogeneous, coherent but very porous, conductive mass. The sintered construction yields an electrode of superior mechanical and electrical properties.

After the sintered nickel powder-nickel filament electrode is formed, it may be treated by any of several known techniques to incorporate therein, by impregnation, electroplating, chemical replacement or otherwise, catalytic materials such as the noble metals of Group VIII of the Periodic Table, which will render the electrode suitable for use as a catalytic electrode in fuel cells which operate at temperatures below 300° F.

The following example illustrates the practice of the invention.

EXAMPLE

A series of sintered nickel electrodes was prepared by mixing varying amounts of grade B carbonyl nickel powder with varying amounts of nickel filaments.

The nickel filaments were obtained by grinding a nickel bar stock of 99.5 percent purity using a belt grinder having a 100 grit $Al_2O_3$ abrasive belt. The nickel filaments obtained by grinding were washed, dried and magnetically separated from the $Al_2O_3$ grit residue and screened to varying mesh sizes. The side distribution of the fibers used in the preparation of the electrodes was as follows:

| Filament mesh size: | Amount of filament in filament composite (wt. percent) |
|---|---|
| −35 to 80 | 5.5 |
| −80 to 100 | 4.2 |
| −100 to 200 | 25.6 |
| −200 to 250 | 8.3 |
| −250 | 56.4 |

The nickel powder and nickel filament were intensively mixed in a solids blender.

Electrode plaques were prepared, using the nickel filament-nickel powder blend, in a graphite form made by machining a cavity 0.033 inch deep by 7 inches wide by 14 inches long in a graphite plate 0.5 inch in thickness. An amount of the nickel filament-nickel powder blend sufficient to fill the cavity was weighed out and placed in the cavity of the form and then leveled with a metal scraper to form a smooth layer.

The graphite form containing the nickel filament-nickel powder mixture was transferred to a sintering furnace provided with a cooling chamber and means for maintaining an atmosphere of hydrogen. The graphite form was heated at 1800° F. for 20 minutes and then pushed into the cooling chamber, which was also provided with a hydrogen atmosphere. After reaching room temperature, the sintered plaque was compressed by rolling between pressure rollers to a thickness of 0.023 inch and trimmed.

Upon the surface of the sintered nickel electrodes, prepared by the above procedure, was disposed by electroless plating a catalyst layer comprised of 20 mg./in.$^2$ of platinum black and 20 mg./in.$^2$ of palladium black of electrode surface.

A hydrogen-oxygen test cell was constructed wherein the electrodes prepared above were utilized as the anode in the cell. The cathode was a porous silver electrode. The cell was operated at a temperature of 70° C. The reactants were supplied at a pressure of 9 lbs./in.$^2$ gauge. A 30 weight percent KOH electrolyte contained within an asbestos membrane was interposed between the anode and cathode to complete the cell.

The table below illustrates the outputs of 3 inch square anodes made according to the above procedure. For purposes of contrast, anodes made from the sintered nickel powder (B grade) alone and sintered nickel powder-nickel filament mixtures outside the scope of the present invention were also tested. The output of the electrodes used in these control runs designated by the symbol C are also listed in the table below.

TABLE

| Run No. | Percent fiber in electrode | IR free voltage at a current density of— | | | |
|---|---|---|---|---|---|
| | | 40 ASF* | 80 ASF | 120 ASF | 160 ASF |
| 1 | 2.5 | 0.924 | 0.902 | 0.872 | 0.850 |
| 2 | 5 | 0.913 | 0.882 | 0.865 | 0.838 |
| 3 | 10 | 0.918 | 0.890 | 0.875 | 0.855 |
| 4 | 15 | 0.936 | 0.910 | 0.880 | 0.850 |
| 5 | 20 | 0.912 | 0.885 | 0.852 | 0.824 |
| $C_1$ | 0 | 0.911 | 0.880 | 0.852 | 0.820 |
| $C_2$ | 25 | 0.911 | 0.882 | 0.854 | 0.823 |
| $C_3$ | 30 | 0.911 | 0.878 | 0.855 | 0.823 |
| $C_4$ | 35 | 0.911 | 0.870 | 0.855 | 0.827 |

*Amperes per square foot.

From the above table, it is readily apparent that the power output of the electrodes prepared in accordance with the present invention (run numbers 1–5) is substantially improved when compared with electrodes prepared in a manner outside the scope of the present invention (run numbers $C_1$–$C_4$).

The embodiments of the invention in which an exclusive property or privilege is claimed are defined as follows:

1. A process for making a sintered fuel cell electrode having improved mechanical strength and power output which comprises heating a mixture of 80 to about 99 percent of a nickel powder and about 1 to about 20 percent by weight of a nickel filament at a temperature of about 1300° to about 2200° F. in a reducing atmosphere for a period of 10 to 60 minutes.

2. The process of claim 1 wherein the nickel powder is a carbonyl nickel powder.

3. The process of claim 1 wherein the nickel powder is a carbonyl nickel powder having a particle size of less than 10 microns.

4. The process of claim 1 wherein the nickel filament is a composite of filaments having diameters ranging from about 0.5 to 10 microns and lengths ranging from about 50 to about 1000 microns.

References Cited

UNITED STATES PATENTS

| 2,455,804 | 12/1948 | Ransley | 29—191.2 |
| 2,833,847 | 5/1958 | Salauze | 29—182 XR |
| 3,114,197 | 12/1963 | Du Bois | 29—182.2 |
| 3,350,200 | 10/1967 | Sandstede | 75—222 XR |
| 3,351,439 | 11/1967 | Josy | 29—182 XR |
| 3,359,099 | 12/1967 | Lindstrom | 75—222 XR |

FOREIGN PATENTS

| 706,486 | 3/1954 | Great Britain. |
| 821,690 | 10/1959 | Great Britain. |

BENJAMIN R. PADGETT, *Primary Examiner.*

A. J. STEINER, *Assistant Examiner.*